April 9, 1963  M. S. CARMICHAEL, JR  3,084,696
PEA VINER HAVING SCREEN UNCLOGGING MEANS
Filed May 16, 1960  4 Sheets-Sheet 1

INVENTOR.
MEAD S. CARMICHAEL JR.
BY Schmieding and Fultz
ATTORNEYS

INVENTOR.
MEAD S. CARMICHAEL JR.
BY
Schmieding and Fultz
ATTORNEYS

April 9, 1963   M. S. CARMICHAEL, JR   3,084,696
PEA VINER HAVING SCREEN UNCLOGGING MEANS
Filed May 16, 1960   4 Sheets-Sheet 3

INVENTOR.
MEAD S. CARMICHAEL JR.
BY
*Schmieding and Fultz*
ATTORNEYS

April 9, 1963   M. S. CARMICHAEL, JR   3,084,696
PEA VINER HAVING SCREEN UNCLOGGING MEANS
Filed May 16, 1960   4 Sheets-Sheet 4

INVENTOR.
MEAD S. CARMICHAEL JR.
BY
Schmieding and Fultz
ATTORNEYS.

United States Patent Office 3,084,696
Patented Apr. 9, 1963

3,084,696
PEA VINER HAVING SCREEN UNCLOGGING MEANS
Mead S. Carmichael, Jr., Columbus, Ohio, assignor, by mesne assignments, to FMC Corporation, San Jose, Calif., a corporation of Delaware
Filed May 16, 1960, Ser. No. 29,229
6 Claims. (Cl. 130—30)

The present invention relates to an improved harvester and, more particularly to a viner for separating peas, beans, or similar products from the vines and hulls.

The present invention is applicable to viners operating on the impact principle wherein the vines are fed into the end of a rotating screen covered drum. A beater cylinder is rotated within the screen covered drum, and a series of beaters are mounted on the outer periphery of the beater cylinder. When the beaters strike the hulls they are burst open by impact and the freed particles of crop, such as peas or beans, and the smaller particles of hull are released outwardly from the drum through the screen covering and thence downwardly to a separating means that separates the particles of crop from the particles of hull.

In general, the present invention relates to a viner of the type described that includes a screen beater means mounted to the frame of the viner adjacent the periphery of the previously mentioned screen covered drum, said beater means being driven to cyclically deliver blows to the screen as the drum rotates whereby particles of hull and vine, that tend to clog the openings in the screen, are continuously dislodged by impact action.

The screen beater means of the present invention is particularly effective when used in combination with a screening means formed of nylon strings, said screening means being described in detail in my co-pending application Serial No. 813,594, filed May 15, 1959, now abandoned.

It is therefore an object of the present invention to provide an improved viner of the screen covered drum type that includes screen beating means for preventing particles of hull and vine from clogging the openings of said screen covered drum.

It is another object of the present invention to provide an improved viner of the type described that combines the self-cleaning action of a screen formed of nylon strings with a beater means that continuously flexes said nylon strings whereby the inherent cleaning ability thereof is most effectively utilized.

Further objects and advantages of the present invention will be apparent from the following description, reference being had to the accompanying drawings wherein a preferred form of embodiment of the invention is clearly shown.

Figure 1:
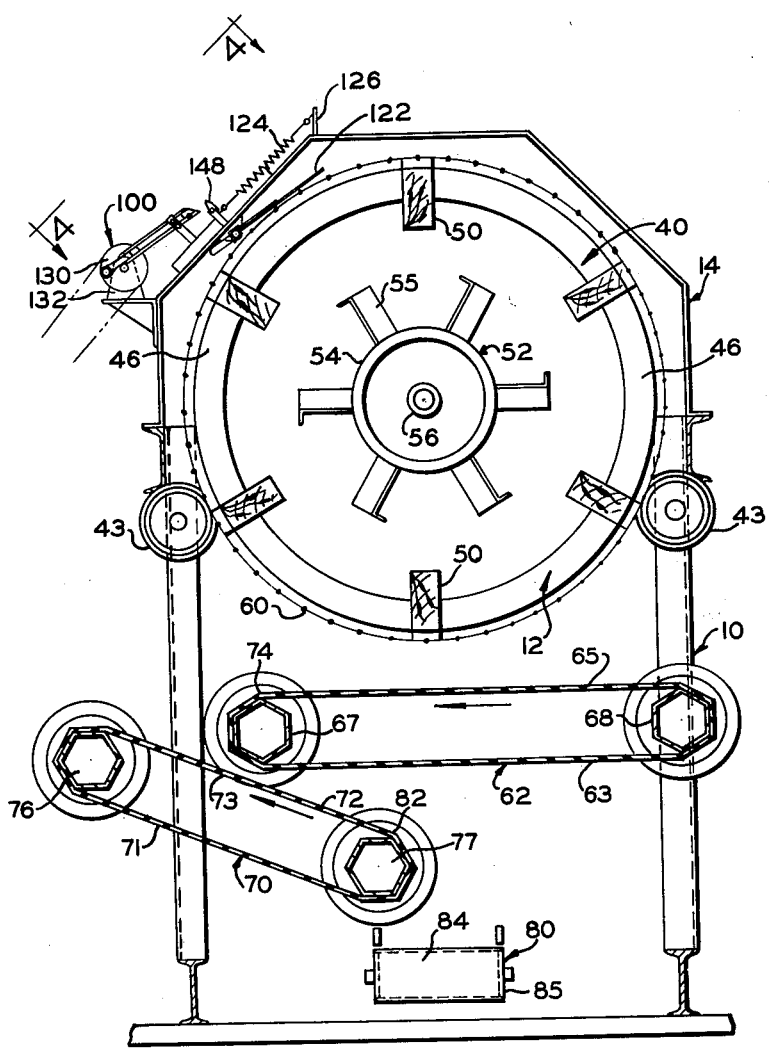
FIG. 1 is a front sectional view of a viner constructed according to the present invention.

Referring in detail to the drawings, the viner illustrated in FIG. 1 includes a frame 10 which supports a crop hulling apparatus indicated generally at 12. A crop separating apparatus, on which the crop and particles of hull and vine are dropped, is indicated generally at 14.

The machine also includes an inclined intake conveyor arranged to feed vines bearing the crop into the front end of the hulling apparatus 12, and a discharge conveyor for carrying away the vines after the crop has been removed from the hulls in the hulling apparatus 12.

Reference is again made to FIG. 1 of the drawings which is a sectional view of the viner showing the supporting frame 10 that rotatably carries a drum 40 supported on the frame by a plurality of rollers 43 which engage the peripheral outer surfaces of drum frame members 46. A plurality of longitudinal members 50 are disposed between the members 46 and comprise a portion of the drum frame as well as providing radially inwardly extending blades for tumbling the vines.

A crop beater means 52 is rotatably disposed within drum 40 for coaxial rotation therewith and comprises a cylinder 54 which supports a plurality of radially extending beaters 55. The ends of cylinder 54 include stub shafts 56 which are journaled in bearing means and driven by a suitable prime mover.

The outer periphery of drum 40 is covered with a plurality of screen sections 60 that cover the open spaces formed by the drum frame members 46 and 50. Screen sections 60 are preferably formed of nylon strings and are of the type described in my co-pending application Serial No. 813,594, filed May 15, 1959.

A crop and hull receiving and conveying means is indicated generally at 62 and is preferably in the form of an endless canvas apron 63 forming a substantially horizontal laterally moving upper surface 65. Apron 63 is rotatably mounted on the frame by hexagonal drums 67 and 68, one of which is driven by a suitable drive mechanism not illustrated.

With continued reference to FIG. 1, a crop and hull separating conveyor is indicated generally at 70 and is preferably formed by an endless apron 71 that includes an inclined upper surface 72, the central portion 73 of which is located beneath a discharge side 74 of collecting and conveying apron 63. Apron 71 is rotatably mounted on the frame by hexagonal drums 76 and 77, the latter being driven by a suitable drive mechanism not illustrated.

A crop collecting means indicated generally at 80 is disposed beneath a lower crop discharge side 82 of inclined apron 71 and is preferably in the form of an endless belt 84 rotatably mounted to the frame by a plurality of drums 85, the latter being rotated by a suitable drive mechanism not illustrated.

Figure 4:
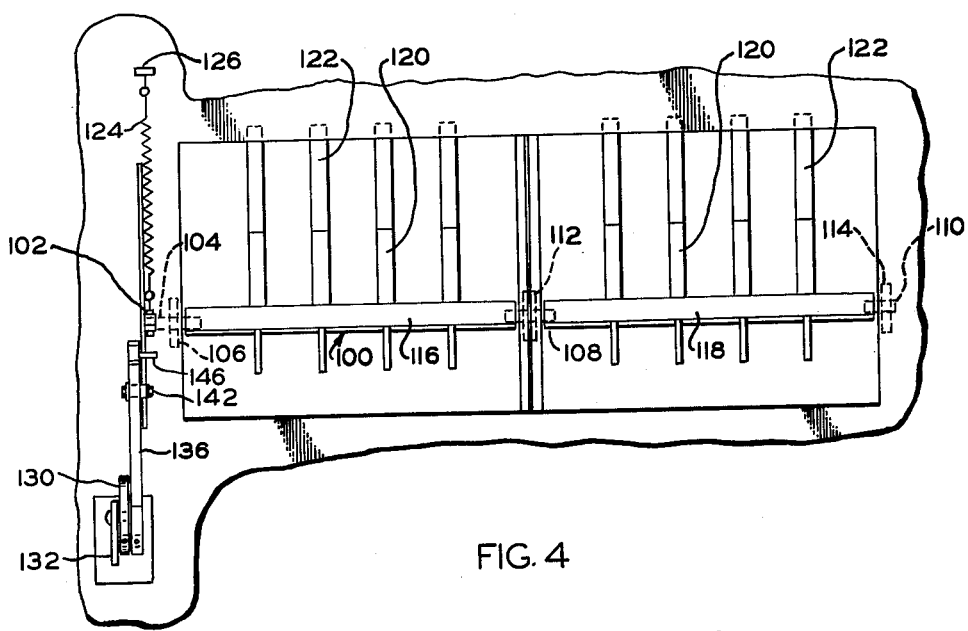
FIG. 4 is an inclined elevational view of a beater mechanism comprising a portion of the present invention, the view being taken along the line 4—4 of FIG. 1.

Reference is next made to FIGS. 2 through 7 which illustrate a novel beater mechanism indicated generally at 100 that includes a lever 102 having an end welded to a short pivot shaft 104 journaled in a bearing 106. Additional pivot shafts 108 and 110, FIG. 4, are carried in bearings 112 and 114 with the ends of said pivot shafts being welded to angle members 116 and 118.

The angle members 116 and 118 carry a plurality of beater members 120 the ends of said beater members being provided with resilient beater portions 122.

The beater portions 122 are preferably formed of heavy fabric impregnated with rubber or other suitable material.

A tension spring 124 is operatively interposed between a bracket 126 on frame 10 and lever 102.

Lever 102 of the beater means is actuated by a crank 130 rotatably mounted to frame 10 by a journal support 132, said crank being connected to the lever by a link 136.

With continued reference to FIGS. 4–7, a driver member or link 136 has one end attached to crank 130 at a pivot 138. Link 136 includes a guide slot 140 that receives a guide pin 142. When crank 130 is rotated about its center 144 in a counter-clockwise direction, as view in FIGS. 2, 3, and 7, link 136 is first extended and then lowered whereby a first latch element 146, in the form of a transverse pin, engages a second latch element 148 on lever 102. As crank 130 continues to rotate, link 136 is withdrawn whereby lever 102 is moved to the left, as viewed in FIGS. 2 and 3, against the tension of spring 124. This raises the beaters 120 and when the crank reaches the position illustrated in FIG. 3, and show diagrammatically in FIG. 7, latch element 146 on link 136 releases latch element 148 on lever 102. Since lever 102 is suddenly released and spring 124 has been stretched, the spring drives resilient beater portions 122 downwardly against an underlying resilient screen 60.

Crank 130 is continuously rotated by a suitable power source, not illustrated, such as the same power source used to rotate drum 40. This causes a cyclical reciprocation of link 136 which serves to cyclically engage, pull, and release lever 102 whereby beaters 120 continuously strike resilient screens 60.

Figures 5, 6:
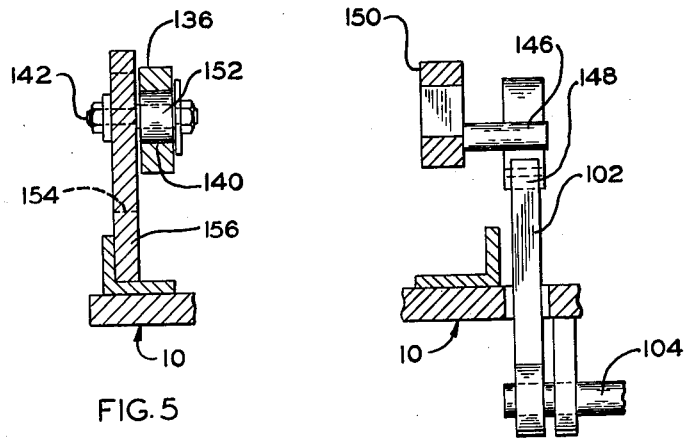
FIG. 5 is an enlarged sectional view of a portion of the beater mechanism of FIGS. 2–7, the section being taken along the line 5—5 of FIG. 2.
FIG. 6 is a second enlarged sectional view of a portion of the beater mechanism of FIGS. 2–7, the section being taken along the line 6—6 of FIG. 2.

With reference to FIG. 6, link 150, lever 102, and their associated latch elements are illustrated in enlarged detail.

Figure 2:
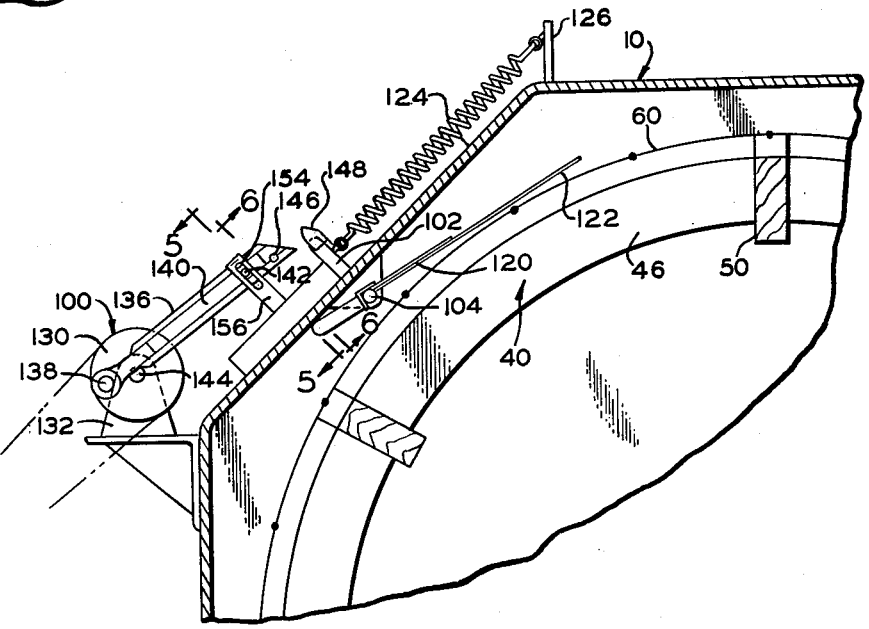
FIG. 2 is an enlarged partial front sectional view of the viner of FIG. 1.
Figure 3:
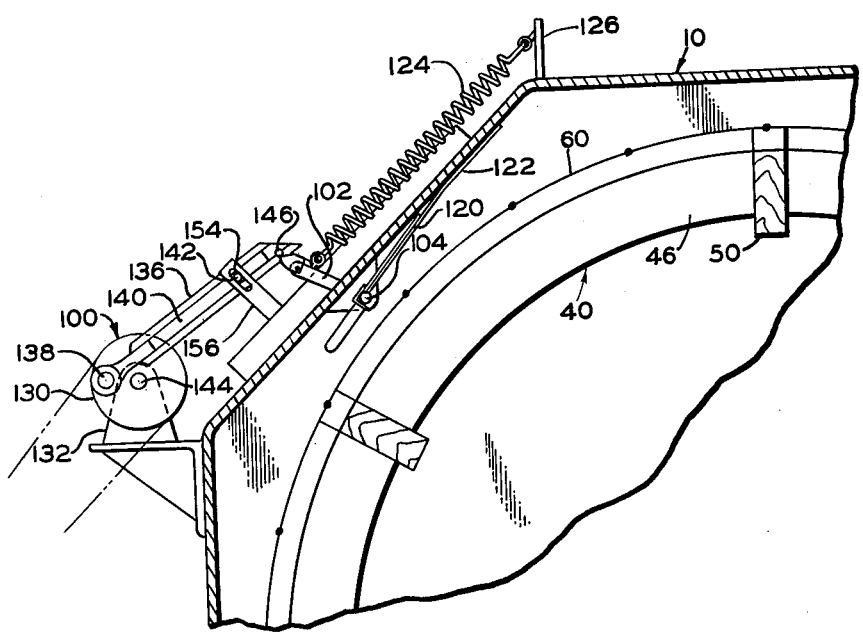
FIG. 3 is a second enlarged partial front sectional view of the viner of the preceding figures.
Figure 7:
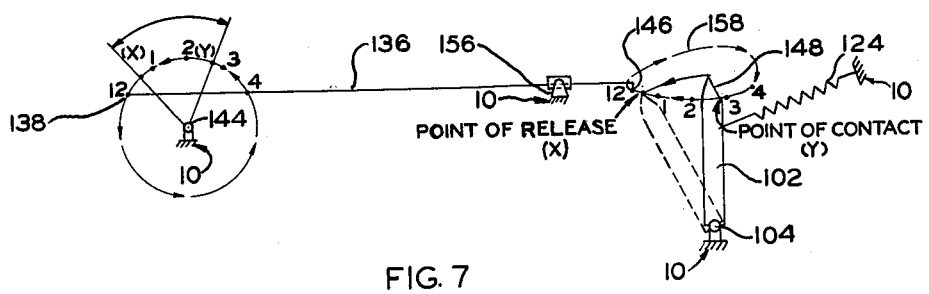
FIG. 7 is a diagrammatic view illustrating the operation of the beater mechanism of FIGS. 2–6.

With reference to FIG. 5, it will be noted that the previously described link 136 is free to reciprocate along a collar 152 slidably mounted in slot 140. The previously mentioned pin 142 is vertically slidably retained in a vertical slot 154 in vertical bracket 156, the latter being mounted on frame means 10 as seen in FIGS. 2, 3, and 5.

In operation, the crop beater means 52 and screen covered drum 40 are continuously rotated while the vines with the crops and hulls intact are introduced into one end of the drum. The crop beaters 55 engage the pods with impact action and cause them to burst and release the particles of crop.

The particles of crop are then thrown outwardly against the inner side of screen 60 and outwardly through the openings therein.

The smaller particles of hull and vine, which are produced by the crop beater impacts, also move outwardly into engagement with the inner side of screen 60. The smaller of these particles of hull and vine will pass readily outwardly through the holes in the screen. Some of the slightly larger particles will, however, tend to partially enter and clog some of the holes in the screen 60. When the resilient beater portions 122 impart cyclical blows to the portion of the screen tending to clog, such clogged screen portion is caused to flex whereby the openings will enlarge and retract in size and any particles of hull and vine that may be clogging some of the openings are released to the exterior of the screen covered drum thus freeing said openings for the efficient release of the crop.

In operation of the beater means 100, crank 130 is rotated by a suitable driving means, such as a power take-off from the primary driving means that rotates drum 40. This actuates link 136 and causes latch element 146 thereon to follow the path indicated by arrows 158 in FIG. 7. Lever 102 is thereby engaged, pivoted, and released whereby spring 124 causes resilient beater members 122 to strike resilient screens 160 with impact action.

While the form of embodiment of the present invention as herein disclosed constitutes a preferred form, it is to be understood that other forms might be adopted, all coming within the scope of the claims which follow.

I claim:
1. In a viner for hulling crop, improved apparatus for separating the crop from the hulls and vines, which apparatus comprises, in combination, a frame; crop beater means rotatably mounted on said frame; a drum rotatably mounted on said frame in surrounding relationship with said crop beater means; a plurality of spaced members on the periphery of said drum, the peripheral surface of said drum having open spaces intermediate said members; screening means covering said open spaces and including a plurality of relatively small openings for the passage of particles of crop and hull to the exterior of said drum; means forming a crop and hull receiving and conveying surface located beneath said rotatable drum for receiving said particles of crop and hull; a beater member movably mounted to said frame and including an impact portion for engaging said screening means, said beater member including a first latch portion; resilient means for urging said beater portion against said screening means; a beater actuating means including a second latch portion for cyclically moving said beater member against the action of said resilient means and for releasing said beater member whereby energy stored in said resilient means drives said beater portion against said screening means with impact action.

2. The apparatus defined in claim 1 wherein said second latch portion is mounted on a reciprocating member including a first guide portion in engagement with a second guide portion on said frame.

3. The apparatus defined in claim 1 wherein said beater actuating means includes a crank, a crank pivot, and a reciprocating driving member including a first end portion mounted on said crank pivot and a second end portion that carries said second latch portion.

4. The apparatus defined in claim 1 wherein said beater actuating means includes a crank, a crank pivot, and a reciprocating driving member including a first end portion mounted on said crank pivot and a second end portion that carries said second latch portion, said reciprocating driving member including a first guide portion; and a second guide portion mounted on said frame and in slideable engagement with said first latch portion.

5. A rotating screen drum apparatus comprising, in combination, frame means; a drum rotatably mounted on said frame means and including spaced drum frame members; screening means extending between said frame members; a beater member movably mounted on said frame and including a portion for engaging said screening means; crank means rotatably mounted on said frame; a reciprocating driving member extending between said crank and said beater member; power means for driving said crank means, said beater member and driving member including coacting detachable latch portions; and means biasing said beater member towards said screening means.

6. The apparatus defined in claim 5 wherein said reciprocating driving member includes a first guide portion; and a second guide portion mounted on said frame and in slideable engagement with said first guide portion.

References Cited in the file of this patent
UNITED STATES PATENTS

| | | |
|---|---|---|
| 403,088 | Burnap | May 14, 1889 |
| 427,774 | Lister | May 13, 1890 |
| 804,858 | Johnson et al. | Nov. 21, 1905 |
| 1,361,051 | Hamachek | Dec. 7, 1920 |
| 2,768,628 | Hermanson | Oct. 30, 1956 |
| 2,865,378 | Carmichael | Dec. 23, 1958 |